(12) United States Patent  
Azad (10) Patent No.: US 9,358,521 B1  
(45) Date of Patent: Jun. 7, 2016

(54) ROBUST HIGH TEMPERATURE SULFUR SORBENTS AND METHODS OF MAKING THE SAME

(75) Inventor: Abdul-Majeed Azad, Perrrysburg, OH (US)

(73) Assignee: The University of Toledo, Toledo, OH (US)

(*) Notice: Subject to any disclaimer, the term of this patent is extended or adjusted under 35 U.S.C. 154(b) by 1185 days.

(21) Appl. No.: 12/632,717

(22) Filed: Dec. 7, 2009

Related U.S. Application Data (60) Provisional application No. 61/120,931, filed on Dec. 9, 2008.

(51) Int. Cl.
*B01J 20/00* (2006.01)
*B01J 20/28* (2006.01)
(Continued)

(52) U.S. Cl.
CPC ............ *B01J 20/28011* (2013.01); *B01J 20/00* (2013.01); *B01J 20/06* (2013.01); *C01B 17/00* (2013.01); *C01G 39/00* (2013.01); *C01G 45/00* (2013.01); *C01G 49/00* (2013.01); *C01G 53/00* (2013.01); *C01P 2002/02* (2013.01);
(Continued)

(58) Field of Classification Search
CPC .... C01B 17/00; C01B 17/02; C01B 17/0447; C01B 17/0226; C01B 17/021; B01J 20/00; B01J 20/06; B01J 20/0203; B01J 20/0211; B01J 20/0214; B01J 20/0218; B01J 20/0222; B01J 20/0244; B01J 20/0225; B01J 20/14; B01J 20/165; B01J 20/18; B01J 20/28011; C01G 3/30; C01G 31/00; C01G 39/006; C01G 39/00; C01G 39/02; C01G 49/0018; C01G 49/009; C01G 49/00; C01G 49/02; C01G 9/00; C01G 9/02; C01G 23/00; C01G 23/04; C01G 41/00; C01G 41/02; C01G 45/00; C01G 45/02; C01G 51/00; C01G 51/04; C01G 53/00; C01G 53/04; C01P 2002/02; C01P 2002/34; C01P 2002/60; C01P 2002/32; C01P 2004/80; C01P 2006/34; C01P 2006/12; C01P 2006/16
See application file for complete search history.

(56) References Cited

U.S. PATENT DOCUMENTS 4,207,382 A 6/1980 Zaromb
4,729,889 A * 3/1988 Flytani-Stephanopoulos et al. .......................... 423/593.1

(Continued)

FOREIGN PATENT DOCUMENTS

EP 0359889 A1 3/1990
WO 2009/152050 A1 12/2009

OTHER PUBLICATIONS

PCT International Search Report and The Written Opinion, PCT/US2009/046403 filed Jun. 5, 2009, dated Jul. 28, 2009.
(Continued)

*Primary Examiner* — Melvin C Mayes
*Assistant Examiner* — Smita Patel
(74) *Attorney, Agent, or Firm* — MacMillan, Sobanski & Todd, LLC (57) ABSTRACT

A sulfur sorbent composition includes a support structure and a double oxide sulfur scavenger that is supported on the support structure. The support structure may be diatomaceous earth or a zeolitic-type mineral, and the sulfur scavenger a metal and/or a metal oxide and/or a combination of two or more metal and/or oxides. The sulfur sorbent composition can be used either as a stand-alone device or in conjunction with a fuel reformer to provide a sulfur-free stream.

18 Claims, 10 Drawing Sheets

(51) Int. Cl.
- B01J 20/06 (2006.01)
- C01B 17/00 (2006.01)
- C01G 45/00 (2006.01)
- C01G 53/00 (2006.01)
- C01G 49/00 (2006.01)
- C01G 39/00 (2006.01)

(52) U.S. Cl.
CPC ......... *C01P2002/34* (2013.01); *C01P 2004/80* (2013.01); *C01P 2006/12* (2013.01)

(56) References Cited

U.S. PATENT DOCUMENTS

| | | | |
|---|---|---|---|
| 6,579,444 B2 * | 6/2003 | Feimer et al. | 208/243 |
| 6,641,625 B1 | 11/2003 | Clawson et al. | |
| 6,713,040 B2 | 3/2004 | Ahmed et al. | |
| 6,878,471 B1 | 4/2005 | Burch et al. | |
| 6,903,051 B2 | 6/2005 | Tao et al. | |
| 6,920,920 B2 | 7/2005 | Whittenberger | |
| 2004/0163311 A1 | 8/2004 | Ahmed et al. | |
| 2006/0090398 A1 | 5/2006 | Katikaneni et al. | |
| 2006/0213187 A1 | 9/2006 | Kupe et al. | |

OTHER PUBLICATIONS

Allen, S. et al., "Marine Applications of Fuel Cells: A Multi-Agency Research Program," Naval Engineers Journal, Jan. 1998, pp. 93-106, vol. 110, Issue 1.

Azad, A.-M. et al., "Development of Ceria-Supported Sulfur Tolerant Nanocatalysts: Rh-Based Formulations," Applied Catalysis A: General, 2007, pp. 77-88, vol. 330.

Azad, A.-M. et al., "Development of Ceria-Supported Sulfur Tolerant Nanocatalysts: Pd-Based Formulations," Applied Catalysis A: General, 2007, pp. 225-236, vol. 332.

Bhandari, V. M. et al., "Desulfurization of Diesel Using Ion-Exchanged Zeolites," Chemical Engineering Science, 2006, pp. 2599-2608, vol. 61.

Bej, S. K. et al., "Search for an Efficient 4,6-DMDBT Hydrodesulfurization Catalyst: A Review of Recent Studies," Energy & Fuels, Sep./Oct. 2004, pp. 1227-1237 vol. 18, No. 5.

Cook, C. S. et al., "Integrated Operation of a Pressurized Fixed Bed Gasifier and Hot Gas Desulfurization System," Ninth Annual Coal-Fueled Heat Engines, Advanced Pressurized Fluidized Bed Combustion (PFBC) and Gas Stream Cleanup Systems Contractors Review Meeting, U.S. Department of Energy Morgantown Energy Technology Center, Oct. 27-29, 1992, Morgantown, West Virginia, Contract No. DE-AC21-87MC23170.

Fukunaga, T. et al., "Development of Kerosene Fuel Processing System for PEFC," Catalysis Today, 2003, pp. 197-200, vol. 84.

Gupta, R. P. et al., "Enhanced Durability of Desulfurization Sorbents for Fluidized-Bed Applications," Topical Report for U.S. Department of Energy, Office of Fossil Energy, Jun. 1991, Morgantown, West Virginia, Contract No. AC21-88MC25006.

Hernandez, A. J. et al., "New Sorbents for Desulfurization of Diesel Fuels via $\pi$-Complexation," AICHE Journal, Apr. 2004, pp. 791-801, vol. 50, No. 4.

Hutchinson, A., "Portable Fuel Cell Runs on Military Jet Fuel to Power Diesel Trucks," Popular Mechanics, Retrieved from Web Sep. 28, 2010, http://popularmechanics.com/cars/alternative-fuel/cells/4236742.

Ma, X. et al., "Deep Desulfurization of Gasoline by Selective Adsorption over Nickel-Based Adsorbent for Fuel Cell Applications," Ind. Eng. Chem. Res., 2005, pp. 5768-5775, vol. 44.

McCoy, A. C. et al., "Performance of Sulfur Tolerant Reforming Catalysts for Production of Hydrogen from Jet Fuel Simulants," Energy & Fuels, 2007, pp. 3513-3519, vol. 21.

Ming, Q. et al., "Steam Reforming of Hydrocarbon Fuels," Catalysis Today, 2002, pp. 51-64, vol. 77.

Novochinskii, I. I. et al., "Low-Temperature H2S Removal from Steam-Containing Gas Mixtures with ZnO for Fuel Cell Application, 2, Wash-Coated Monolith," Energy & Fuels, 2004, pp. 584-589, vol. 18.

Song, C., "An Overview of New Approaches to Deep Desulfurization for Ultra-Clean Gasoline, Diesel Fuel and Jet Fuel," Catalysis Today, 2003, pp. 211-263, vol. 86.

Steinfeld, G. et al., "Distillate Fuel Processing for Marine Fuel Cell Applications," AICHE Spring 2000 Meeting, Mar. 5-9, 2000, Session TD004, Atlanta, Georgia.

Zhou, A. et al., "Liquid-Phase Adsorption of Multi-Ring Thiophenic Sulfur Compounds on Carbon Materials with Different Surface Properties," J. Phys. Chem. B., 2006, pp. 4699-4707, vol. 110.

\* cited by examiner

ROBUST HIGH TEMPERATURE SULFUR SORBENTS AND METHODS OF MAKING THE SAME

CROSS-REFERENCE TO RELATED APPLICATIONS

This application claims the benefit of U.S. Provisional Application Ser. No. 61/120,931 filed Dec. 9, 2008, the entire disclosure of which is expressly incorporated herein by reference.

STATEMENT REGARDING SPONSORED RESEARCH

This invention was not made with any government support and the government has no rights therein.

FIELD OF THE INVENTION

The present invention relates to the development of robust sulfur sorbents and to the use of the such robust sorbents in sulfur removal from gas streams.

BACKGROUND OF THE INVENTION

Fuel cells are electrochemical devices that continuously convert chemical energy into electric energy for as long as fuel and oxidant are supplied. Different categories of fuel cells are known, including proton exchange membrane fuel cells (PEMFCs) and solid oxide fuel cells (SOFCs) which are both fueled by hydrogen. SOFCs can also be fueled by other fuels such as carbon monoxide, natural gas and other hydrocarbons. The primary advantages of fuel cell power generation include increased efficiency, lower weight and smaller size, less air pollution, and reduced noise.

Fuel cells are being considered for use in many different applications. For example, they may be used to power automobiles such as passenger cars and light-duty trucks, and naval vessels including surface ships and submarines. NASA envisions employing SOFCs running on jet fuel reformate for its Uninhabited Aerial Vehicle (UAV) and Low Emission Alternative Power (LEAP) missions as well as for transatlantic and intercontinental commercial airline flights. The U.S. military is also considering the use of fuel cells that are fueled by jet fuel reformate.

The jet fuel is subjected to a reforming process in a fuel processor to produce hydrogen-rich reformate. However, depending on the source and kind, jet fuels are invariably sulfur-laden to the extent of about 0.3-1.0 weight percent. Coal, another logistic fuel and available in plenty also contains sulfur (as organosulfur) as high as 3%. The sulfur poisons the reforming catalyst used in the reforming process. Also, when sulfur is present in the fuel used in a fuel cell, it poisons the fuel cell anode and thereby degrades the performance of the fuel cell.

Therefore, it is necessary to pay close attention to these sulfur compounds when the desulfurization is considered in the fuel pre-processing device.

In addition, it would be desirable to provide improved sulfur sorbents.

SUMMARY OF THE INVENTION

The present invention is an improvement which will become evident to those skilled in the art from the details provided below. Specifically, the sorbent compositions show good performance in terms of breakthrough time, as well as the sorption capacity (gram sulfur per gram sorbent)

The sulfur sorbent composition comprises a support structure, and a sulfur scavenger that is supported on the support structure. In certain embodiments, the support structure comprises diatomaceous earth. In certain other embodiments, the support structure comprises zeolitic-type clay.

The sulfur scavenger comprises a crystalline double oxide material or a triple oxide material that is comprised of two or more metals selected from the group of: titanium, manganese, iron, cobalt, nickel, copper, zinc, molybdenum and tungsten.

In one embodiment, the sulfur scavenger is comprised of a double oxide material comprised of the oxides of zinc and molybdenum.

In certain embodiments, the double oxide material is comprised of an inorganic chemical compound that is also useful as a corrosion inhibitor where the double oxide is essentially non-toxic because of its insolubility in water. Its handling, therefore, does not cause health concerns.

In specific embodiments, the sorbent formulation can be hypostoichiometric, hyperstoichiometric or stoichiometric with respect to two or more of the double oxides.

In another aspect, there is provided herein use of the sulfur sorbent composition in a reformer device, where such combination can be used in a process of reforming a sulfur-containing fuel in order to produce a hydrogen-rich reformate.

In certain embodiments, reformer device includes a reforming catalyst that is supported on a catalytic support.

Various advantages of this invention will become apparent to those skilled in the art from the following detailed description of the preferred embodiments, when read in light of the accompanying drawings.

DETAILED DESCRIPTION OF THE PREFERRED EMBODIMENTS

In one aspect, there is provided a sulfur sorbent composition that is suitable for use in many different applications. In certain embodiments, the sorbent composition is suitable for use in a reforming process to remove sulfur from the fuel and/or from the reformate.

The sulfur sorbent composition described herein provides an improvement over existing sulfur removal techniques that use a hydrotreating procedure, where the fuel stream is treated with hydrogen to convert the organosulfur into $H_2S$, which is then stripped of sulfur using a suitable catalyst. This process is accordingly called hydrodesulfurization (HDS) and requires the use of high pressure $H_2$. A US Department of Defense stipulation requires operation at low pressure which cannot be achieved using the traditional HDS methods. For example, the $ZnO$—$H_2S$ reaction can be used to reduce fuel sulfur content from 3000 ppm to about 10 ppm, based on the chemistry, described by the following reaction: $ZnO\ (s)+H_2S\ (g) \rightarrow ZnS\ (s)+H_2O\ (g)$; $\Delta G^\circ_R=-62$ kJ@527° C. A sulfur removal system for a fuel cell operation is expected to retain its operational integrity for ≥40,000 hours and hundreds of thermal cycles for stationary applications and ≥5000 hours and ~3000 thermal cycles for mobile (transportation) systems. Unfortunately, ZnO-based sorbents do not conform to these stringent requirements. Several problems are associated with regeneration and multicycle use of zinc sorbents. First, ZnS regeneration requires $O_2$ and is quite exothermic: $ZnS\ (s)+1.5O_2\ (g) \rightarrow ZnO\ (s)+SO_2\ (g)$; $AG^\circ_R=-448$ kJ@600° C. This translates into requiring very low oxygen content in the regeneration gas in order to control the regeneration temperature. Second, too much oxygen in the regeneration stream leads to zinc sulfate formation, further reducing the effectiveness of the sorbent in later cycles: $ZnS\ (s)+2O_2\ (g) \rightarrow ZnSO_4\ (s)$. As fully set forth herein, the sulfur sorbent composition described herein provides an advantage over prior sulfur sorbent materials.

The sulfur sorbent composition described herein includes a porous support structure and one or more sulfur scavengers. Useful porous support structures have a highly ordered and periodic nanoporous structure, such as being endowed with highly periodic pores with substantially identical pore size (submicrometer to nanometer in diameter). The sorbent support structure preferably has a large percentage of voids (empty spaces) to accommodate a sulfur scavenger material, as described below.

In certain embodiments, the porous support structure is made from diatomaceous earth which is a highly periodic nanoporous structured fossilized remains of small aquatic plants (diatoms). There are as many as 60,000 species of diatom and a corresponding number of different diatomaceous earths, each with unique porous morphology. Diatomaceous earth has about 90% voids and its use accommodates the sulfur scavenger materials. In addition, diatomaceous earth is light in weight (for example, about 50% lighter than alumina), and is a naturally occurring, environmentally benign material that is thermally and chemically inert. In certain specific embodiments, the fossilized remains of the *Aulacoseira* variety of diatom and/or clinoptilolite variety of the naturally-occurring zeolitic minerals are useful as inert support structures. One suitable porous support structure comprises diatomaceous earth that contains periodic nanopores.

In certain other embodiments, the porous support structure is made from a lightweight zeolitic-type mineral belonging to the family of aluminosilicates. One suitable support structure comprises zeolitic-type mineral that contains mesopores.

The porous support material thus provides a support for the sulfur scavenger material and allows the sulfur scavenger material to acts as a sulfur binder. In certain embodiments, the sulfur scavenger is effectively incorporated into the pores of either the porous diatomite support structure, or the porous zeolitic mineral support structure.

It is desired that the sulfur scavenger material, or a combination of different sulfur scavenger material, can be used in the sulfur sorbent composition. In certain preferred embodiments, the sulfur sorbent composition is able to maintain its operational integrity (activity and capacity) over an extended period of time and for multiple thermal cycles. In one non-limiting example, the sulfur sorbent composition maintains its operational integrity for over 5,000 hours and hundreds of thermal cycles, at temperatures of desulfurization that range from about 450 to about 800° C.

In certain embodiments, the sulfur scavenger material comprises a double oxide having the formulation: $ABO_x$, where A and B are different metals and x is an integer. In a particular embodiment, the double oxide is made by reacting oxides of two different metals that are selected from the group: Ti, Mn, Fe, Co, Ni, Cu, Zn, Mo, and W. In certain embodiments, the double oxide is prepared by combining oxides of zinc and molybdenum, or by combining oxides of zinc and tungsten. The double oxide material can be used in a suitable amount, or combination with the support.

In certain embodiments, the double oxide material is present in the sulfur scavenger material in ranges from about 1% to about 10%, by weight, of the sorbent support.

In one embodiment, the double oxide material can be made by a suitable fabrication method which involves: solid-state reaction, sol-gel technique, coprecipitation, hydrothermal processing, organometallic combustion and such.

In one preferred embodiment, the sulfur sorbent composition is made by a method in which the sulfur scavenger material is effectively incorporated into the support structure (diatomaceous earth or clinoptilolite) without causing substantial degradation of the periodic porous features of the support structure, while still yielding a highly active and agile sulfur sorbent composition. In certain embodiments, the sulfur sorbent composition is made by adding the porous support structure and the sulfur scavenger to a liquid medium, and dispersing the materials by mixing so that the sulfur scavenger is incorporated homogeneously throughout and/or within the voids in the support structure.

Uses of the Sulfur Sorbent Material

The sulfur sorbent composition can be used to desulfurize different types of liquid jet fuel and/or mixtures of different jet fuels, for example, jet fuels such as JP-8 and Jet-A as well as gasified coal streams and diesel. Jet-A fuel ($C_{11.8}H_{22.2}$, close to dicycloparaffins) is very similar to diesel and JP-8 is quite similar to kerosene in its sulfur content and other characteristics. Since the preferred form of these fuels is in their vaporized form, the sulfur sorbent composition described herein can be used for optimum and effective desulfurization. In addition, types of jet fuels, such as those used on international flights, can be reformed using the sulfur sorbent compositions described herein. Also, the sulfur sorbent compositions described herein are useful for deriving sulfur-free hydrogen-rich reformate from diesel fuel.

The sulfur sorbent compositions of the invention can be employed in combination with any other suitable devices/structures to facilitate their use in particular processes. In one non-limiting example, the sulfur sorbent compositions are useful with devices and/or structures that are used in steam reforming process.

In one non-limiting example, there is provided herein a reformer device comprising a sulfur scavenger supported a porous support structure, wherein the sulfur scavenger comprises a crystalline double oxide material.

In another non-limiting example, there is provided herein a fuel cell anode comprising a sulfur sorbent composition as described herein.

In another non-limiting example, there is provided herein a process for reforming a sulfur-containing fuel comprising: providing the sulfur sorbent composition of claim 1 on a catalytic support, and exposing to sulfur-containing fuel sufficient to remove substantially all the sulfur from the sulfur-containing fuel.

in another non-limiting example, there is provided herein a method for removing sulfur from a sulfur-containing fuel feed stream, comprises the step of conveying the feed stream through a sulfur sorbent composition as described herein.

In another non-limiting example, there is provided herein a fuel reforming system incorporating a sulfur sorbent material positioned upstream of a fuel reforming stage in the direction of fuel flow through the system, wherein the sulfur sorbent material comprises the sulfur sorbent composition as described herein.

In another non-limiting example, there is provided herein a process for producing fuel, comprising desulfurizing a sulfur-containing hydrocarbon feedstock by use of a sulfur sorbent composition as described herein and, subsequently, reforming the desulfurized product.

Examples

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference.

The following examples are intended to illustrate certain preferred embodiments of the invention and should not be interpreted to limit the scope of the invention as defined in the claims, unless so specified.

The value of the present invention can thus be seen by reference to the Examples herein. In order that the nature of the compositions and the methods described herein may be more clearly understood, preferred forms thereof will now be described by reference to the following experimental results and examples. The compositions of the samples referred to in the experimental results are shown below in Table 1.

TABLE 1

| ID | Formulation | % Composition (wt/wt basis) |
|---|---|---|
| ZM1 | Zinc molybdate, $ZnMoO_4$ | 100% |
| ZM2 | Zinc molybdite, $ZnMoO_3$ | 100% |
| CZM1 | Clinoptilolite + Zinc molybdate ($ZnMoO_4$) | 90/10 to 99/1 |
| DZM1 | Diatomite + Zinc molybdate ($ZnMoO_4$) | 90/10 to 99/1 |

Figure 1A:
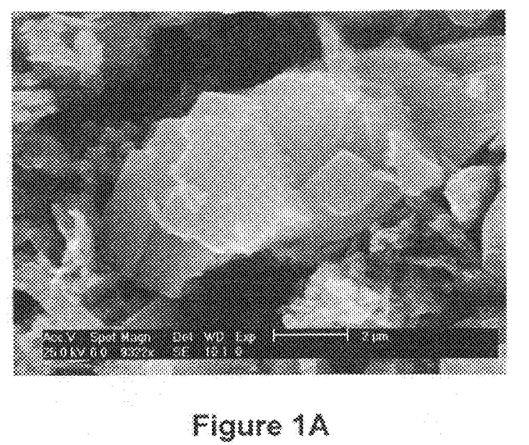
FIG. 1A shows a scanning electron micrograph (SEM) of a clinoptilolite support structure.
Figure 1B:
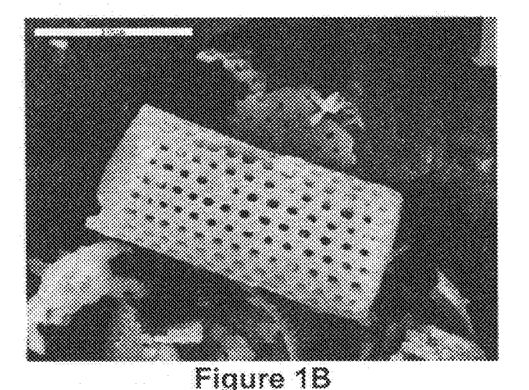
FIG. 1B shows a scanning electron micrograph (SEM) of a diatomite structure.

FIG. 1A and FIG. 1B show the scanning electron micrographs (SEM) of the two inert support matrices used in the development of desulfurizers. FIG. 1A shows a scanning electron micrograph (SEM) of a clinoptilolite support structure. FIG. 1B shows a scanning electron micrograph (SEM) of a diatomite structure.

Preparation of the Active Sorbent Component

Calculations are made with regard to the total amount of the oxides of zinc and molybdenum ($ZnO$ and $MoO_3$, respectively) required for preparing 100 g batch of the desired formulation, viz., $ZnMoO_4$. The amounts of each of the two oxides are weighed and mixed first manually in an agate mortar and pestle for 30 minutes, followed by ball-milling in alcohol for 4 h in a Nalgene bottle using zirconia balls as the milling media.

The mixture is calcined in static air at 500° C. for 2 h using a ramp rate of 1°/min during heating and cooling cycle both. The calcined mixture is crushed and homogenized in a mortar and pestle again for about 30 minutes, followed by calcination for 2 h at 700° C. at same ramp rates as before. X-ray diffraction is carried out to confirm the formation of the intended double oxide, namely, $ZnMoO_4$ at the end of this process. Microscopic images are collected via scanning electron microscopy. Thermogravimetric analysis (TGA) is performed up to 1000° C. to ensure phase integrity, absence of melting and no loss of material due to volatilization.

Further tests to investigate the phase stability and the reducibility to a lower oxide ($ZnMoO_3$) was carried out by heating the material made above, in hydrogen steam (flow rate 100 sccm) at 1000° C. for 5 h. Phase identification was carried out by XRD.

Figure 2:
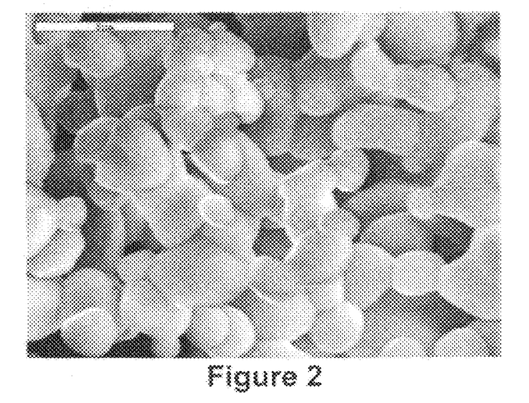
FIG. 2 is a scanning electron microscope image of the pure double oxide sorbent (SCALE BAR: 5 µm).

FIG. 2 shows the SEM image of the double oxide ($ZnMoO_4$) as-prepared by the solid-state reaction route described above.

Figure 3A:
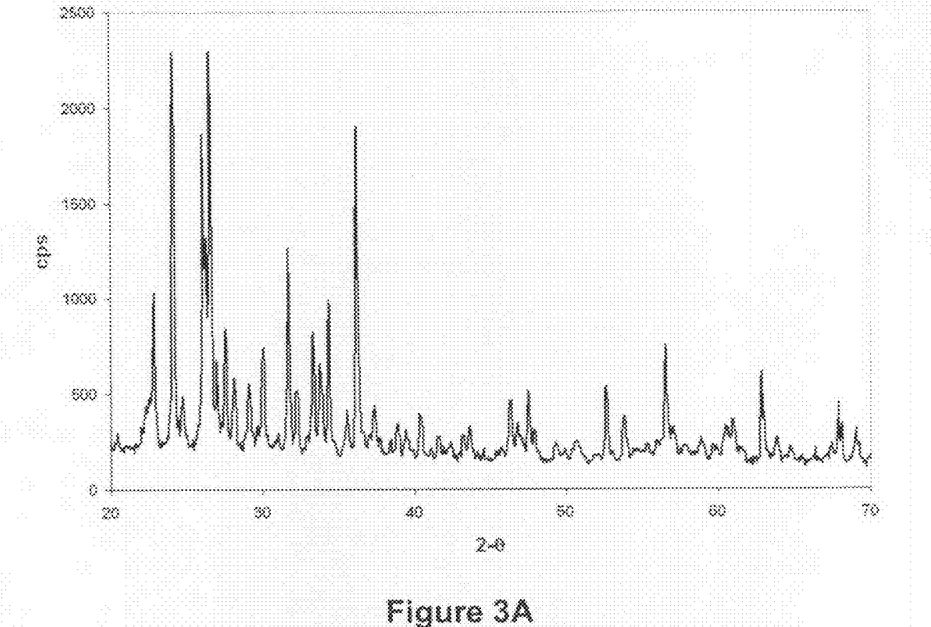
FIG. 3A shows a XRD pattern of a double oxide sorbent prepared by solid-state reaction (whose SEM image is shown in FIG. 2).

The complex nature of the XRD pattern shown in FIG. 3A is indicative of the triclinic crystalline nature of this compound; the component oxides namely, zinc oxide ($ZnO$) and molybdenum oxide ($MoO_3$) crystallize in simple hexagonal and orthorhombic geometry, respectively.

Figure 3B:
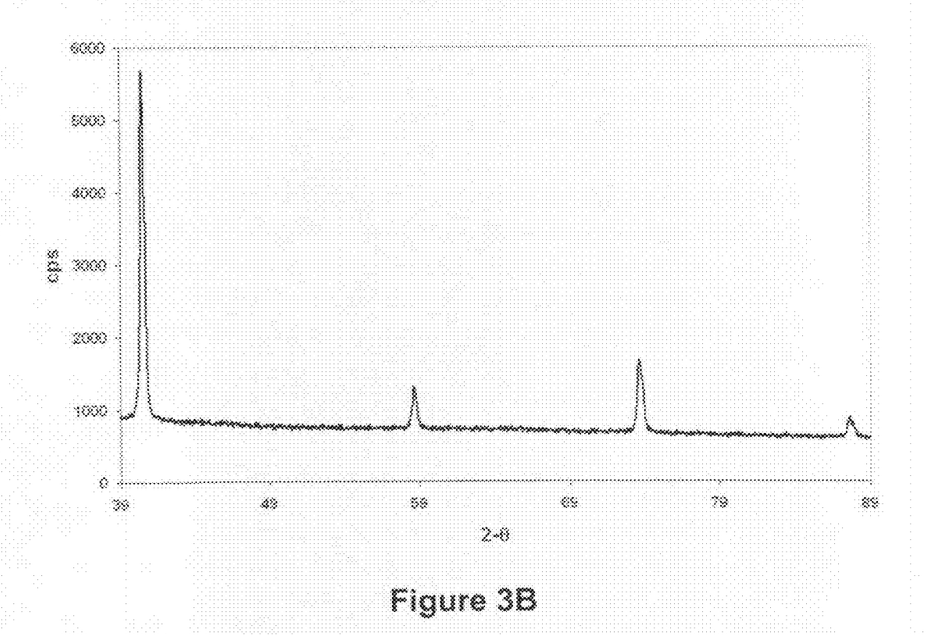
FIG. 3B shows a XRD pattern of the double oxides prepared by solid-state reaction and reduced in hydrogen at 1000° C. for 5 h.

The XRD pattern of the parent double oxide after it is reduced in hydrogen stream for 5 h at 1000° C., shown in FIG. 3B is relatively simpler and is suggestive of the fact that the reduced phase ($ZnMoO_3$) has a simpler orthorhombic structure, typical of $A^{II}B^{IV}O_3$ type compounds.

Sulfidation Experiments and Performance Comparison

For the sulfur sorption (sulfidation) experiments, each sorbent is exposed to a stream of nitrogen gas containing 1000 ppm $H_2S$, flowing at 100 Sccm for 4, 24, 48, 100 and 168 h at 800° C. For each run, 1 g of the sorbent powder is kept in a stainless steel filter (with a pore size of 5µ) and covered with a loosely packed glass wool to allow easy access to the oncoming gas. The sorbent packed filter is placed in a tubular quartz reactor with 1" ID and 19" length. The $H_2S$ concentration in the exit stream is measure by an online-gas chromatograph (Shimadzu GC 2010; FPD detector), which was programmed to analyze the gas stream and collect data every 3 minutes.

Figure 4A:
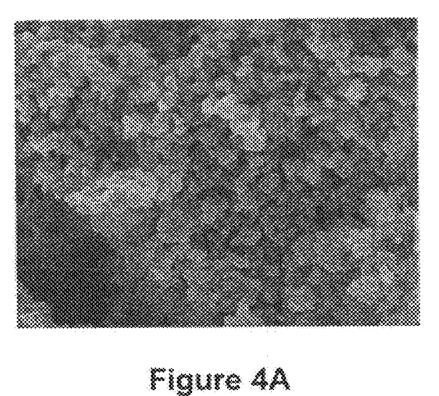
FIGS. 4A-4D show the elemental mapping in an unsulfided sorbent.
Figure 4B:
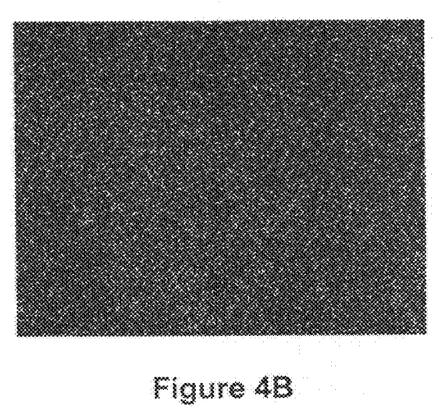
Figure 4C:
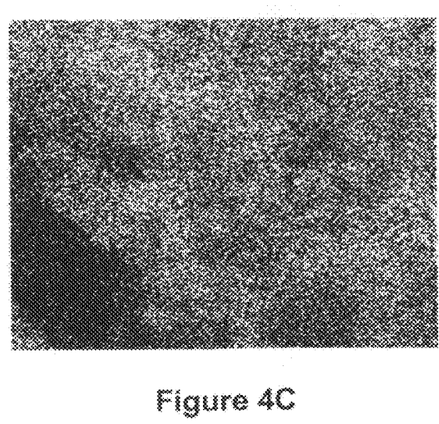
Figure 4D:
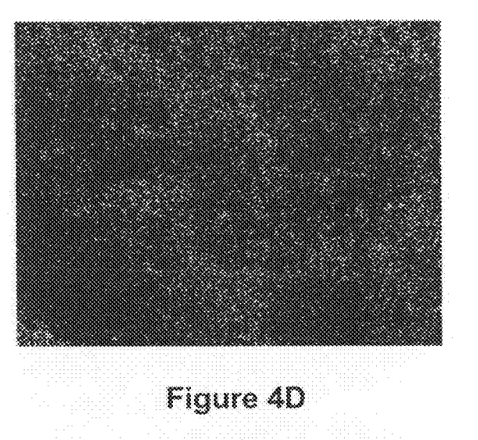
Figure 4E:
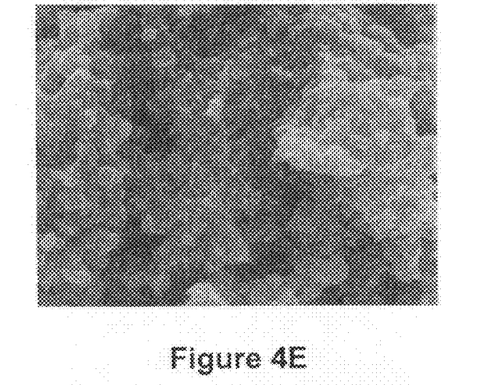
FIGS. 4E-4I show the elemental mapping in the sorbent sulfided for 4 h.

FIGS. 4A-4D show the elemental mapping in an unsulfided sorbent. FIG. 4B shows Zn, FIG. 4C shows Mo; FIG. 4D shows O.

Figure 4F:
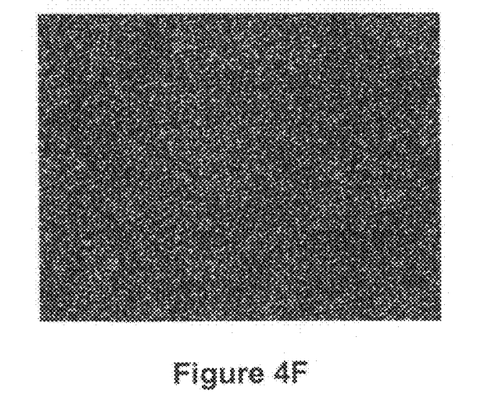
Figure 4G:
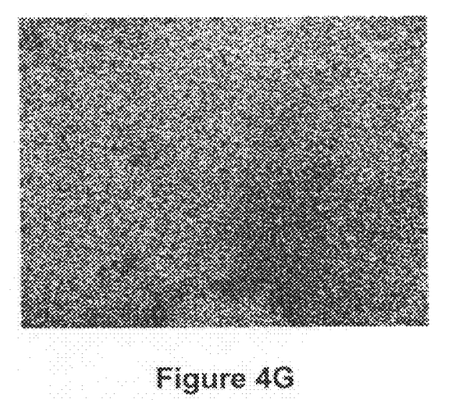
Figure 4H:
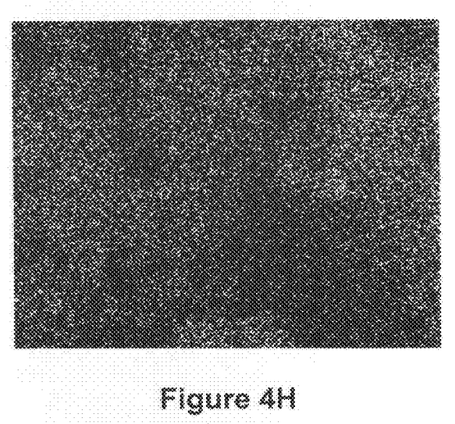
Figure 4I:
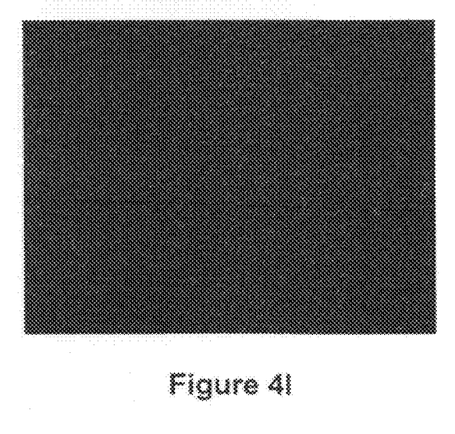
Figure 4J:
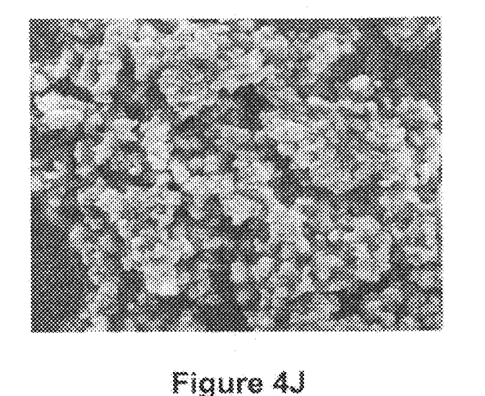
FIGS. 4J-4N show the elemental mapping in the sorbent sulfided for 48 h.

FIGS. 4E-4I show the elemental mapping in the sorbent sulfided for 4 h. FIG. 4F shows Zn, FIG. 4G shows Mo; FIG. 4H shows O; FIG. 4I shows S.

Figure 4K:
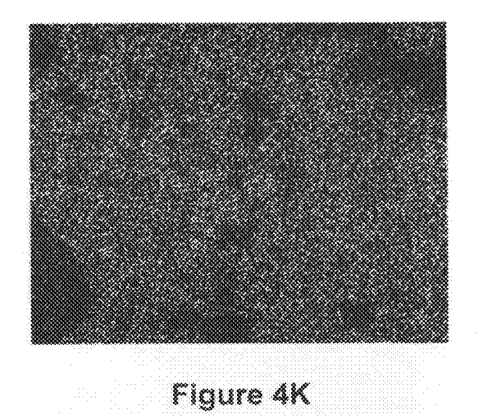
Figure 4L:
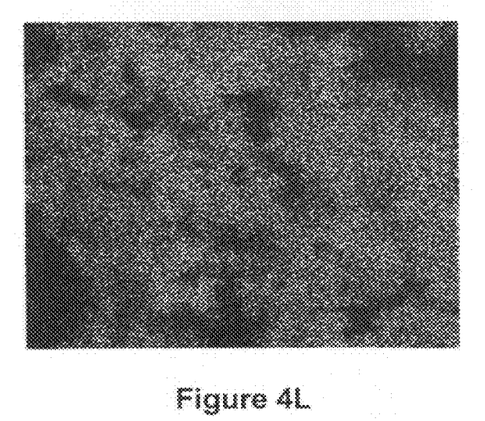
Figure 4M:
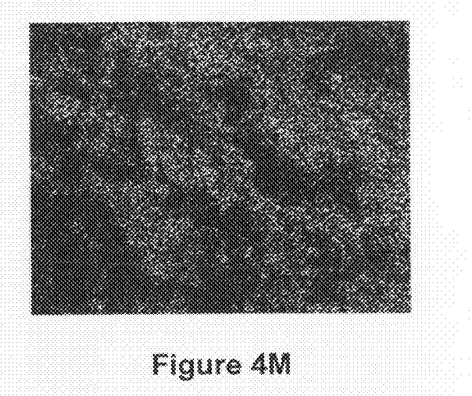
Figure 4N:
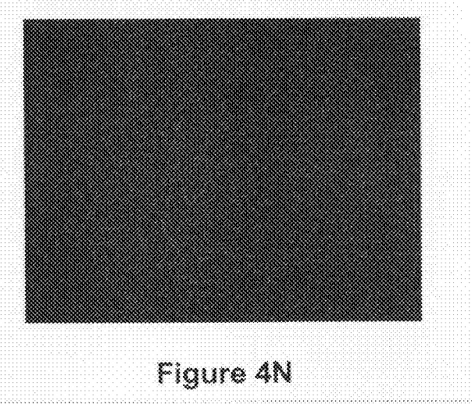

FIG. 4J-4N show the elemental mapping in the sorbent sulfided for 48 h. Evidence of sulfur is seen in the samples exposed to $H_2S$ stream. FIG. 4K shows Zn, FIG. 4L shows Mo; FIG. 4M shows O; FIG. 4N shows S.

Figure 5:
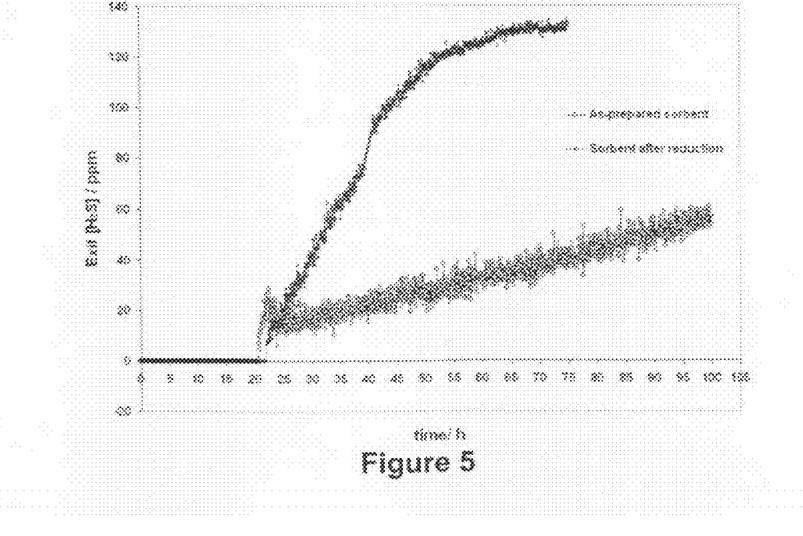
FIG. 5 shows a comparison of the sulfur sorption capacity of the as-prepared and $H_2$-reduced double oxide sorbent in clinoptilolite matrix.

FIG. 5 compares the sulfur sorption characteristics of the as-prepared and $H_2$-reduced double oxide sorbent of this invention, dispersed in clinoptilolite matrix, when exposed to 1000 ppm $H_2S$/bal. $N_2$ for 100 h. The sorbent with as-prepared formulation shows breakthrough after 20.5 h (on-set of saturation) of continuous soaking. The sulfur sorption, however, continues effectively, showing only about 60 ppm $H_2S$ in the exit stream after 100 hours of continued exposure. The reduced formulation, on the other hand, though shows a delayed break-through at round 22 h from the start, continues to saturate rather faster than the as-prepared analog; the sulfur in the exit stream is more than twice (130 ppm) at the end of 75 hours.

Figure 6:
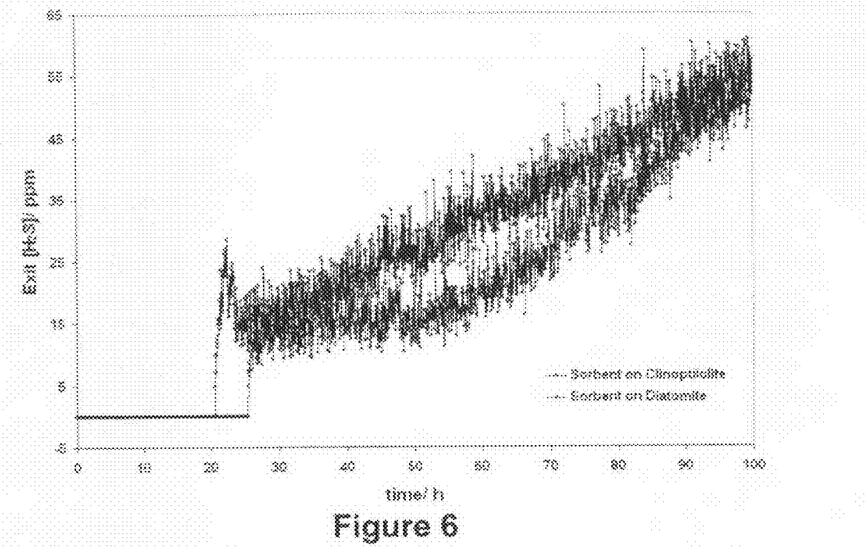
FIG. 6 shows the sulfur sorption capacity of the sorbent in clinoptilolite and diatomite matrices, on-stream with 1000 ppm $H_2S$/bal. nitrogen for 100 h at 800° C.
Figure 7A:
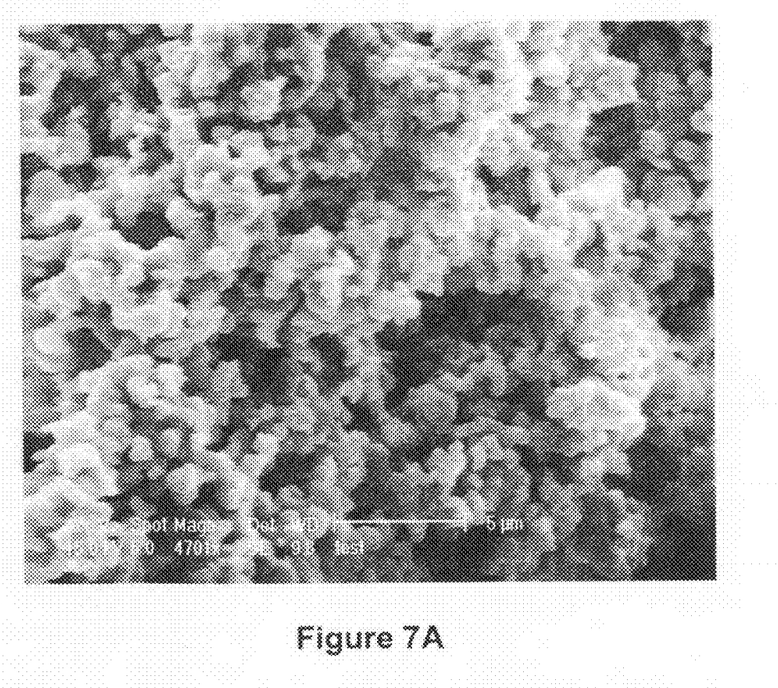
FIGS. 7A-7D shows a comparison of the evolved microstructural features (in sequence from left to right) in the pure oxide sorbent (FIG. 7A) with those in subjected to sulfidation in 1000 ppm $H_2S$/bal. $N_2$ stream for 4 h (FIG. 7B), 24 h (FIG. 7C), 48 h (FIG. 7D) and 168 h (FIG. 7E) (scale bar: 5 µm).
Figure 7B:
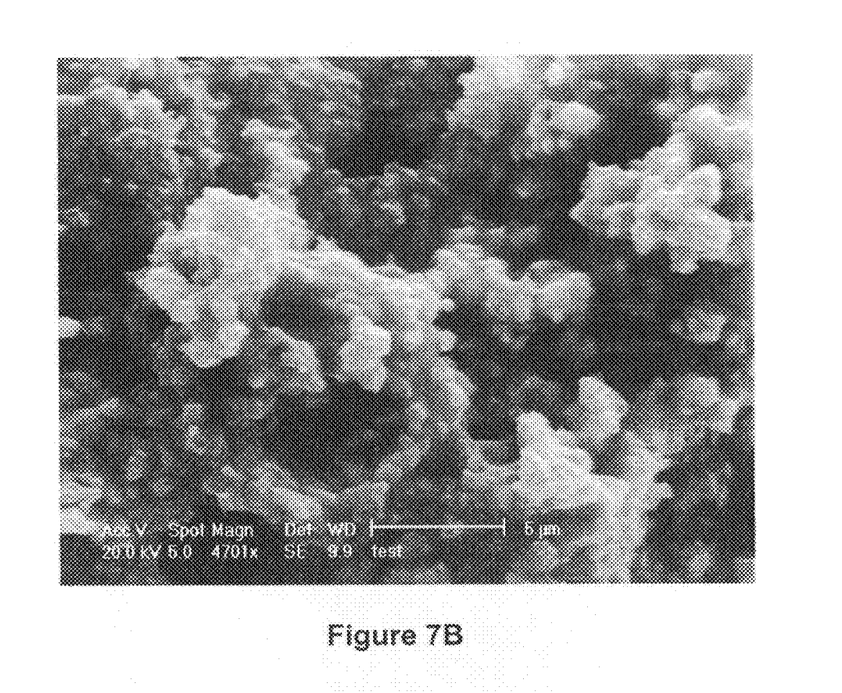
Figure 7C:
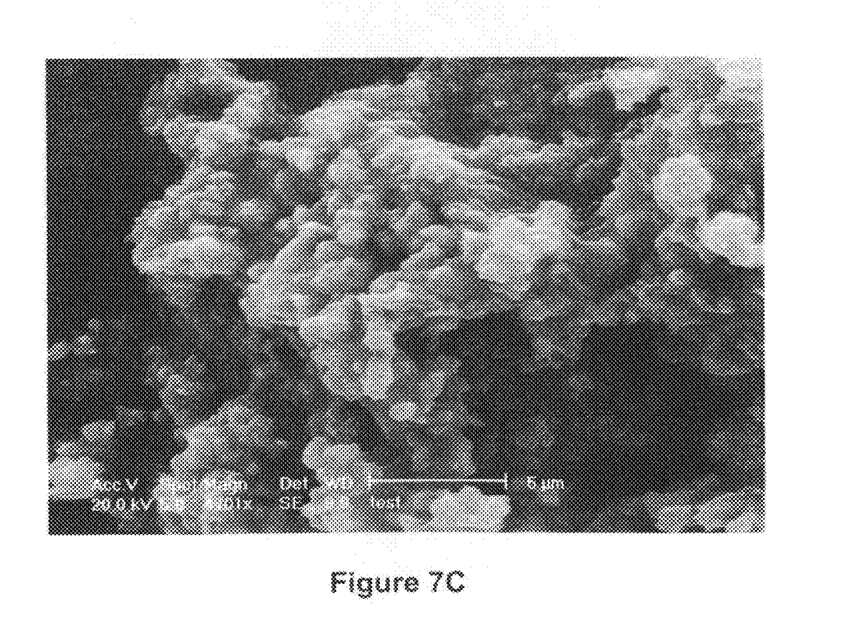
Figure 7D:
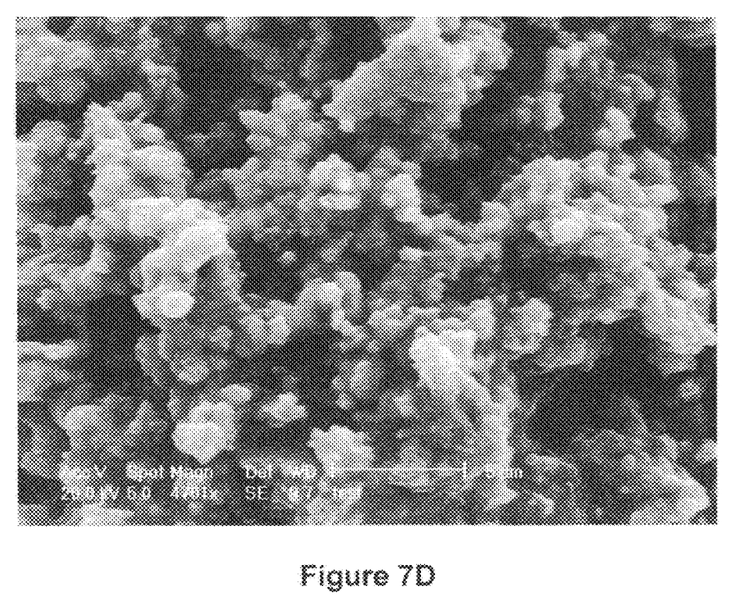
Figure 7E:
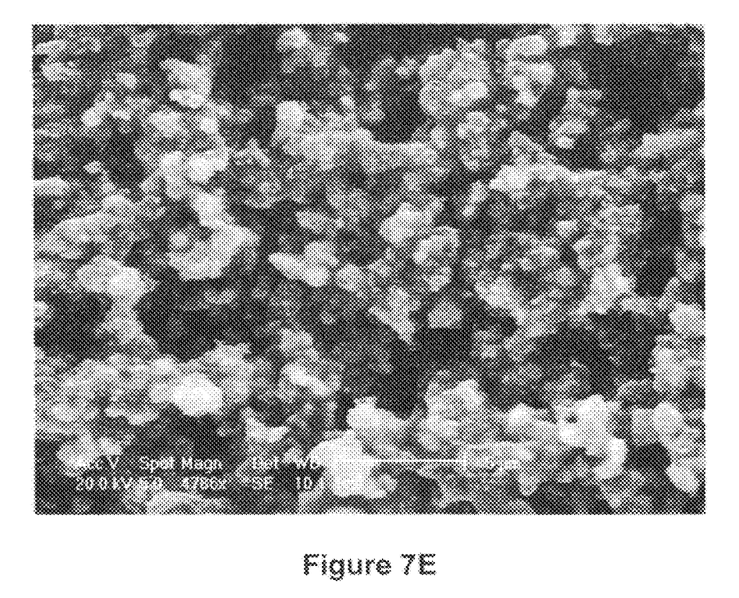

The sulfur sorption characteristics of $ZnMoO_4$ dispersed in clinoptilolite and diatomite matrices, on-stream with 1000 ppm $H_2S$/bal. nitrogen for 100 h at 800° C. are compared in FIG. 6. The diatomite-based formulation showed superior behavior by 5$h$ lag in breakthrough compared to that based on clinoptilolite. Apart from this, the two formulations behaved almost identically.

The amount of sulfur picked up by the two formulations over a period of 100 h exposure as determined by quantitative chemical analysis is very impressive. The amount of sulfur sorbed is 21100 ppm (2.11 gram) and 20000 ppm (2.00 gram) per gram of clinoptilolite and diatomite based sorbent, respectively.

The morphological artifacts of the pure and sulfided sorbent formulations are shown in FIGS. 7A-7E. Nearly identical microstructural features of all the samples indicate that the effect of short as well as long term sulfur exposure is minimal.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

The invention claimed is:

1. A sulfur sorbent composition comprising:
   at least one chemically inert porous support structure; and
   a sulfur scavenger material supported on the porous support structure and incorporated into the pores of the porous support structure, the sulfur scavenger material consisting of a crystalline solid double oxide material that does not melt during sulfur scavenging, wherein the sulfur scavenger material retains its crystalline structure and phase stability during sulfur scavenging at a temperature ranging from about 450° C. to about 800° C.

2. The sulfur sorbent composition of claim 1, the crystalline solid double oxide material having a formulation of $ABO_x$, wherein x is 3 or 4 and A and B are selected from the group Ti, Mn, Fe, Co, Ni, Cu, Zn, Mo, and W.

3. The sulfur sorbent composition of claim 1, wherein the crystalline solid double oxide material comprises oxides of zinc and molybdenum.

4. The composition of claim 1, wherein the porous support structure comprises diatomaceous earth that contains periodic nanopores.

5. The composition of claim 1, wherein the porous support structure comprises zeolitic-type mineral that contains mesopores.

6. The composition of claim 1, wherein the crystalline solid double oxide material is one of: zinc molybdate ($ZnMoO_4$) or zinc molybdite ($ZnMoO_3$).

7. The composition of claim 1, wherein the porous support structure comprises clinoptilolite, and the crystalline solid double oxide material is one of: zinc molybdate ($ZnMoO_4$) or zinc molybdite ($ZnMoO_3$).

8. The composition of claim 1, wherein the porous support structure comprises diatomite, and the crystalline solid double oxide material is zinc molybdate ($ZnMoO_4$).

9. The composition of claim 1, adapted for use in a reforming process to substantially remove sulfur from a fuel.

10. The composition of claim 1, adapted for use in a reforming process to substantially remove sulfur from a jet fuel.

11. The composition of claim 1, adapted for use in a reforming process to substantially remove sulfur from a diesel fuel.

12. The composition of claim 1, adapted for use in a reforming process to substantially remove sulfur from a reformate.

13. The composition of claim 1, adapted for use in a liquid phase desulfurization process.

14. The composition of claim 1, adapted for use in a vapor phase desulfurization process.

15. The composition of claim 1, adapted for use in a steam reforming process of sulfur-laden fuel.

16. The sulfur sorbent composition of claim 1, wherein the sulfur scavenger material is present from about 1% to about 10%, by weight, of the support structure.

17. A reformer device comprising a sulfur scavenger material supported on a porous support structure and incorporated into the pores of the porous support structure, wherein the sulfur scavenger material consists of a crystalline solid double oxide material that does not melt during sulfur scavenging, wherein sulfur scavenging occurs from about 450° C. to about 800° C.

18. A sulfur sorbent composition comprising:
   at least one chemically inert porous support structure; and
   a sulfur scavenger material supported on the porous support structure and incorporated into the pores of the porous support structure, the sulfur scavenger material consisting of a crystalline solid double oxide material that does not melt below 1000° C.

* * * * *